UNITED STATES PATENT OFFICE.

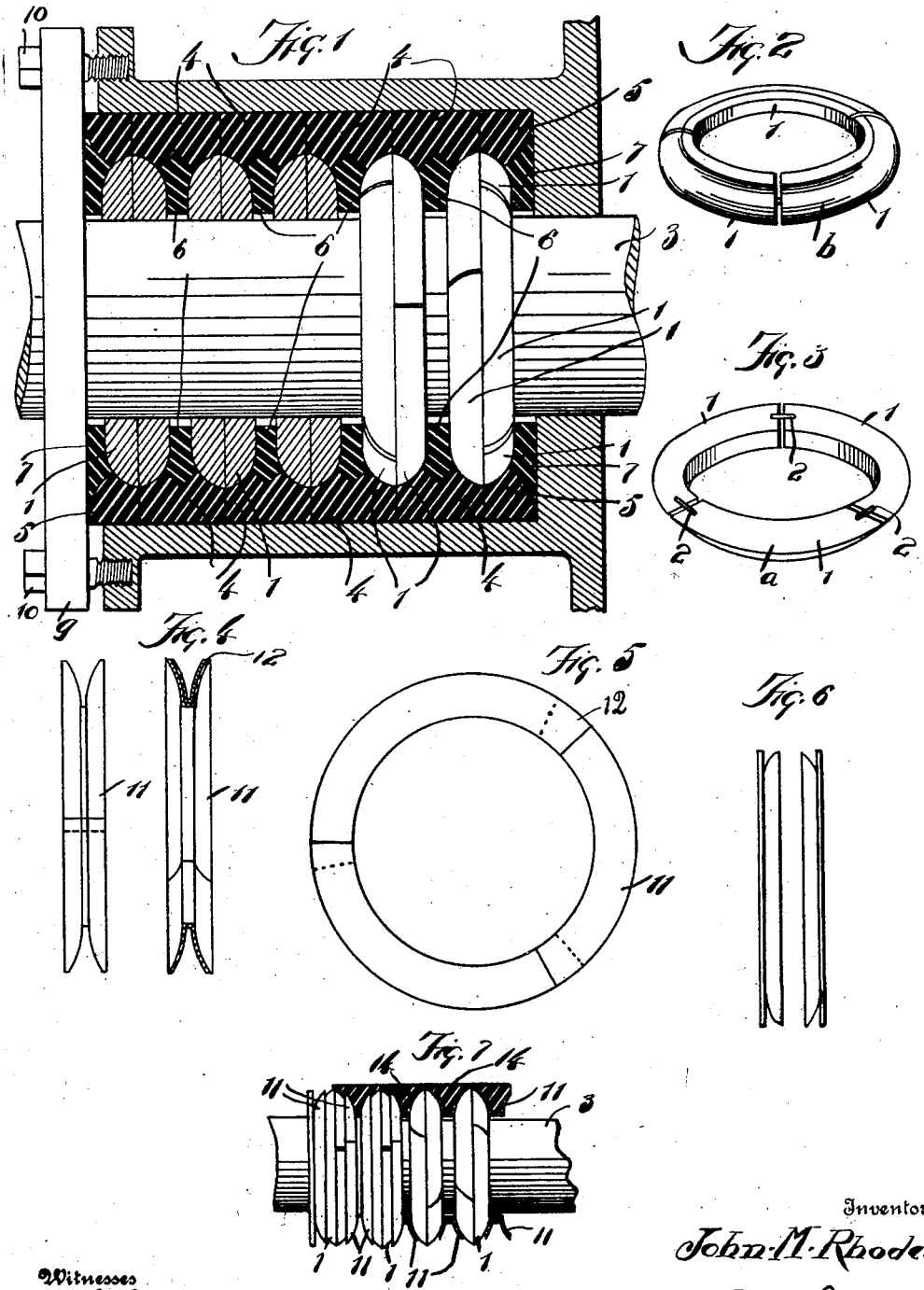

JOHN M. RHODES, OF DALLAS, TEXAS.

METALLIC PACKING.

No. 930,230.    Specification of Letters Patent.    Patented Aug. 3, 1909.

Application filed November 19, 1908. Serial No. 463,407.

*To all whom it may concern:*

Be it known that I, JOHN M. RHODES, a citizen of the United States, residing at Dallas, in the county of Dallas and State of Texas, have invented certain new and useful Improvements in Metallic Packing, of which the following is a specification.

My invention relates to metallic packing for piston rods and other rods and shafts and more particularly to packing composed of sectional rings of metal and rings of rubber, and the object is to provide such packing and to provide the packing with shields to protect the rubber rings. When such packing is placed on rods that operate in oil, the oil attacks the rubber and soon destroys the rubber rings or eats the rubber rings so that the rings are beaten against the metal rings and the wall of the packing box until the rubber rings are worthless.

One of the objects of this invention is to provide shields for the rubber rings which will protect the rings from the oil and which will not impair the vibrations of the packing.

Other objects and advantages will be fully explained in the following description.

Reference is had to the accompanying drawings which form a part of this application and specification.

Figure 1 is a longitudinal section of a packing box, showing the rubber rings and their shields in section, three metallic rings in section, and two metal rings complete. Fig. 2 is a perspective view of one half of a metallic ring, the outside surface being shown. Fig. 3 is a similar view, but showing the inside surface. Fig. 4 illustrates a variation in the shields for the rubber rings, this figure showing an edge view of a shield and also a diametrical section of a shield. Fig. 5 is a side elevation of a shield, such as is shown in Fig. 4. Fig. 6 is an edge view of a shield, of the character of shield shown in Fig. 4, which is necessary for the end of the packing box. Fig. 7 illustrates the manner of placing the shields, shown in Figs. 4 to 6, on the packing rings.

Similar characters of reference are used to indicate the same parts throughout the several views.

This invention includes a plurality of metal rings composed of sections 1 which are flexibly connected together by small soft wires 2. Each ring, when connected by the wires 2, has a flat side *a* and a curved side *b*. A packing ring is formed by placing the flat faces of two rings together to be placed on the rod.

3 indicates a rod of the ordinary type on which the packing is used. The metallic rings are spaced apart by rings 4 of soft rubber and rings 6 of asbestos or fibrous material which are molded with the rubber rings 4. The asbestos rings 6 protect the rubber 4 from the oil about the rod 3. The packing rings of metal are held away or spaced from the packing box 8 and gland 9 by narrow rings 5 of rubber and rings 7 of asbestos, the rings 5 and 7 being molded together. The gland 9 may be forced against the packing by screw bolts 10 which engage threaded perforations in the rim of the packing box. The asbestos rings or shields 6 and 7 do not come in contact with the shaft 3. Five complete packing rings are shown in Fig. 1 of the drawings. It will be understood that any number of packing rings may be used. The packing rings are made up of two metal sectional rings and in placing the two rings together the joints of the sections are broken, as shown in Figs. 1 and 7, so steam or gas will not pass through the rings. The rubber rings 4 provide for the necessary vibration of the packing, and asbestos rings 6 prevent the oil about the shaft from destroying the utility of the rubber. It is preferable to mold the rubber rings and the asbestos rings together.

I show a variation in the shields for protecting the rubber from attack by the oil. In Figs. 4 to 7 inclusive of the drawings, I illustrate a shield composed of thin sheet metal. The packing rings composed of sections 1 are spaced apart by shields 11 which rings are substantially V-shaped in cross section, as shown. Each ring 11 is made of a plurality of sections which telescope together, as shown at 12. The rubber rings 14 are placed in the exterior annular grooves of the shields and engage the outer portions of the metal rings. The thin sheet metal shields 11 prevent the oil from attacking the rubber.

Having fully described my invention what I claim as new and desire to secure by Letters Patent, is,—

In a packing box of the character described, packing for rods or shafts comprising a plurality of metal rings, each formed of sections flexibly connected together, rubber rings between the said metal rings and said box and the inner edges thereof extending between the metal rings, and shields engaging the inner edges of said rubber rings and extending partly on the sides thereof between the rubber rings and the metal rings, peripheral portions of the metal rings being exposed to said rubber rings.

In testimony whereof I set my hand in the presence of two witnesses, this 10th day of November, 1908.

JOHN M. RHODES.

Witnesses:
S. A. TEMPLE,
A. L. JACKSON.